(12) United States Patent
Marsh et al.

(10) Patent No.: US 6,373,562 B1
(45) Date of Patent: Apr. 16, 2002

(54) FIBEROPTIC CABLE TESTER

(76) Inventors: Kim A. Marsh, 5351 Berkley Dr., Naples, FL (US) 34112; James M. Davis, 4687 Pond Apple Dr. South, Naples, FL (US) 33999; Johannes Martin Blum, 9570 Crecent Garden Dr. #210, Naples, FL (US) 34109

( * ) Notice: Subject to any disclaimer, the term of this patent is extended or adjusted under 35 U.S.C. 154(b) by 0 days.

(21) Appl. No.: 09/415,869

(22) Filed: Oct. 8, 1999

Related U.S. Application Data

(60) Provisional application No. 60/103,831, filed on Oct. 9, 1998.

(51) Int. Cl.$^7$ ................................................ G01N 21/00
(52) U.S. Cl. ...................................................... 356/73.1
(58) Field of Search ........................ 356/73.1; 382/100, 382/128, 141, 151, 152, 254, 276, 288, 300; 385/115–117; 348/65, 67, 68; 600/101–102, 160, 175

(56) References Cited

U.S. PATENT DOCUMENTS 3,663,822 A * 5/1972 Uchida
4,657,014 A * 4/1987 Edelman et al.
5,755,510 A * 5/1998 Hernandez et al.

* cited by examiner

*Primary Examiner*—Frank G. Font
*Assistant Examiner*—Tu T. Nguyen
(74) *Attorney, Agent, or Firm*—William E. Noonan

(57) ABSTRACT

A fiberoptic cable tester includes a body having an inlet fitting, an outlet and a channel that extends between the inlet fitting and the outlet. A magnification and focusing assembly is mounted within the channel between the inlet fitting and the outlet. A fiberoptic cable end fitting is communicably interengaged with the inlet fitting and light is transmitted through the magnification and focusing assembly and the channel to the outlet. The light is projected from the outlet and against a target area to produce an image which is indicative of the condition of the fiberoptic cable.

16 Claims, 8 Drawing Sheets

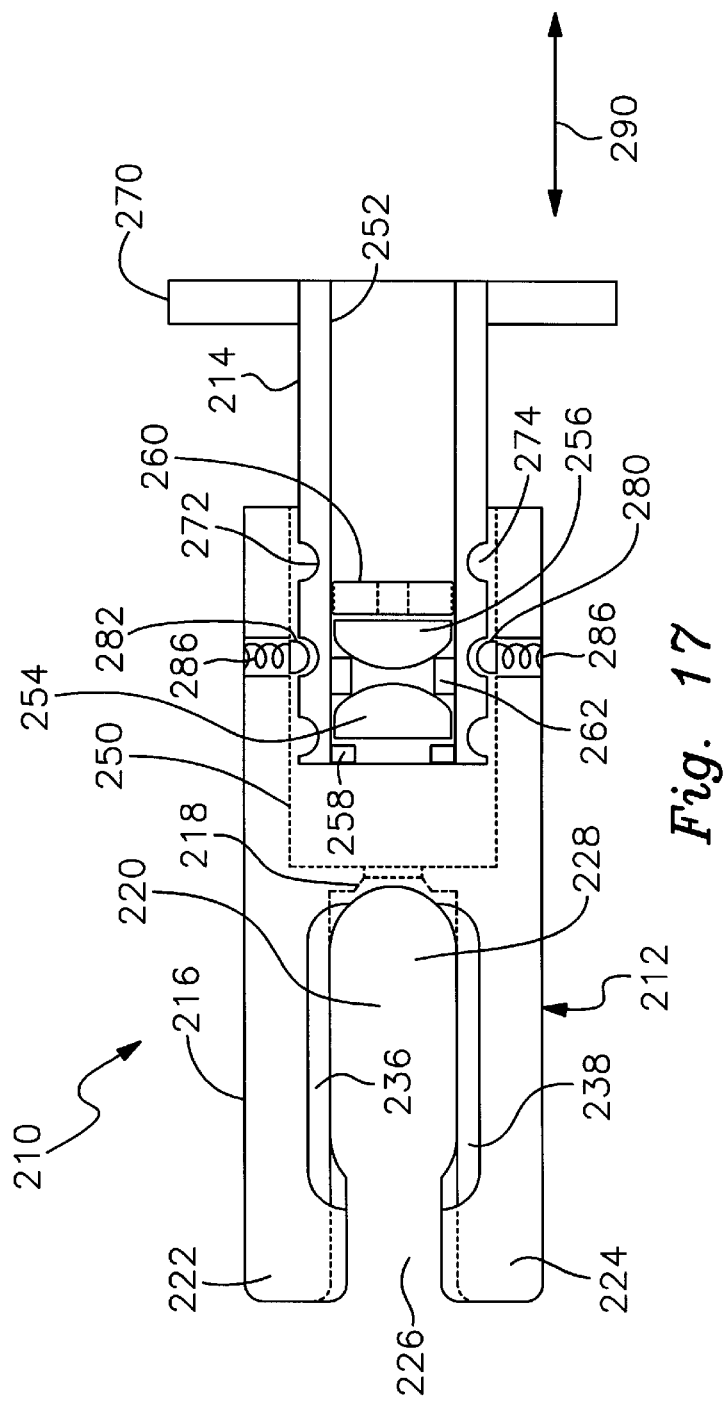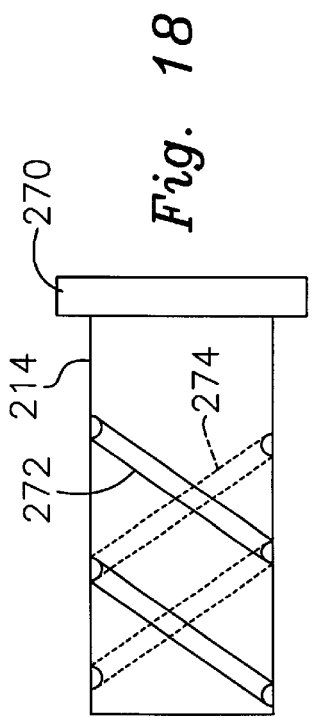

FIBEROPTIC CABLE TESTER

RELATED APPLICATION

This application claims the benefit of U.S. Provisional Pat. App. Ser. No. 60/103,831 filed Oct. 9, 1998.

FIELD OF THE INVENTION

This invention relates to a fiberoptic cable tester and, more particularly, to a device for measuring fiber breakage in a fiberoptic cable.

BACKGROUND OF THE INVENTION

Fiberoptic cables are widely used in a variety of industrial and medical applications. For example, such cables are commonly found in telecommunications equipment as well as in medical and dental illuminating systems. As the typical cable is used and ages, it tends to deteriorate. The cable is repeatedly bent and flexed. This causes the individual optical strands or fibers to gradually weaken and eventually break. When a sufficient number of fibers have broken, the cable transmits light much less effectively. Poor illumination is clearly undesirable in applications such as surgery and should be rectified as quickly as possible. Nonetheless, determining precisely when the cable must replaced usually requires "eye-balling" the light output and considerable guesswork. It is also difficult to determine whether inadequate illumination is due to deterioration of the cable or a problem with the light source. Currently, there is no efficient tester available for quickly, accurately and conveniently monitoring the light output of the cable and determining precisely when the cable should be replaced.

SUMMARY OF INVENTION

It is therefore an object of this invention to provide a tester for quickly, conveniently and accurately monitoring fiber breakage and light output in a fiberoptic cable.

If is a further object of this invention to provide a fiberoptic cable tester that may be engaged quickly, conveniently and effectively with virtually all existing fiberoptic cables including straight, angled and bifurcated cables.

It is a further object of this invention to provide a fiberoptic cable tester that is quickly and easily adjusted to produce an accurate light output indicative of the quality and condition of the cable.

It is a further object of this invention to provide a fiberoptic cable tester that enables the user to quickly and accurately determine whether poor light output is due to deterioration of the cable or a problem with the light source.

This invention features a test apparatus for a fiberoptic cable. The apparatus includes a body having an inlet fitting through which light is introduced, an outlet through which light is discharged and an internal channel that communicably interconnects the inlet fitting and the outlet. The inlet fitting is communicably engaged by the standard output fitting of a cable to be tested such that the output fitting introduces light into the tester body through the inlet fitting. A magnifying and focusing lens assembly is mounted within the channel between the inlet fitting and the outlet. Light projected from the outlet fitting of the cable is transmitted by the magnifying and focusing assembly and emitted from the outlet onto a target area. The light projected from the outlet produces a light pattern on the target area that indicates the condition of the cable being tested.

In a preferred embodiment the body includes a pair of generally cylindrical components that are axially aligned and interconnected telescopically such that the components are longitudinally adjustable relative to one another. This permits the image produced by the emitted light on the target area to be magnified and focussed as desired. A first body component may include the inlet fitting and a first channel portion. A second body component may include the outlet and a second channel portion. The second body component may be received within the first channel portion of the first body component and adjusted longitudinally back and forth within the first channel portion. The first and second body components may be threadably interconnected. The first body component may include a first set of threads formed internally about the first channel portion and the second body component may include a second set of threads formed externally about the second body component. Alternatively, one of the bodies may include a threaded track and the other body may include one or more bearings that slidably engage the track.

The magnification and focusing assembly may include a pair of lenses. The lenses may be convex lenses that are arranged such that their respective convex surfaces face one another within the channel. Preferably, the lenses are permanently mounted within the second body component.

The receptacle may include a radial notch that accommodates at least a part of the output fitting of the cable being tested. The distal end of the second body component may include a circumferential flange. The flange may be knurled about its circumferential surface.

Preferably, the inlet fitting includes a longitudinal slot that extends along the first body portion and intersects the exterior wall of the first body portion. The inlet fitting may also include a central receptacle that communicates with the first channel portion. In such versions the longitudinal slot accommodates a cable that is connected to the outlet fitting at an angle of other than 180°. The slot also accommodates a bifurcated cable. The central receptacle typically communicably engages the outlet of the fiberoptic cable.

DETAILED DESCRIPTION OF PREFERRED EMBODIMENTS

Other objects, features and advantages will occur from the following description of preferred embodiments and the accompanying drawings, in which:

FIG. 17 is a cross sectional view of the preferred tester of FIG. 16;

FIG. 18 is an elevational side view of the second body portion used in the tester of FIG. 16;

Figure 1:
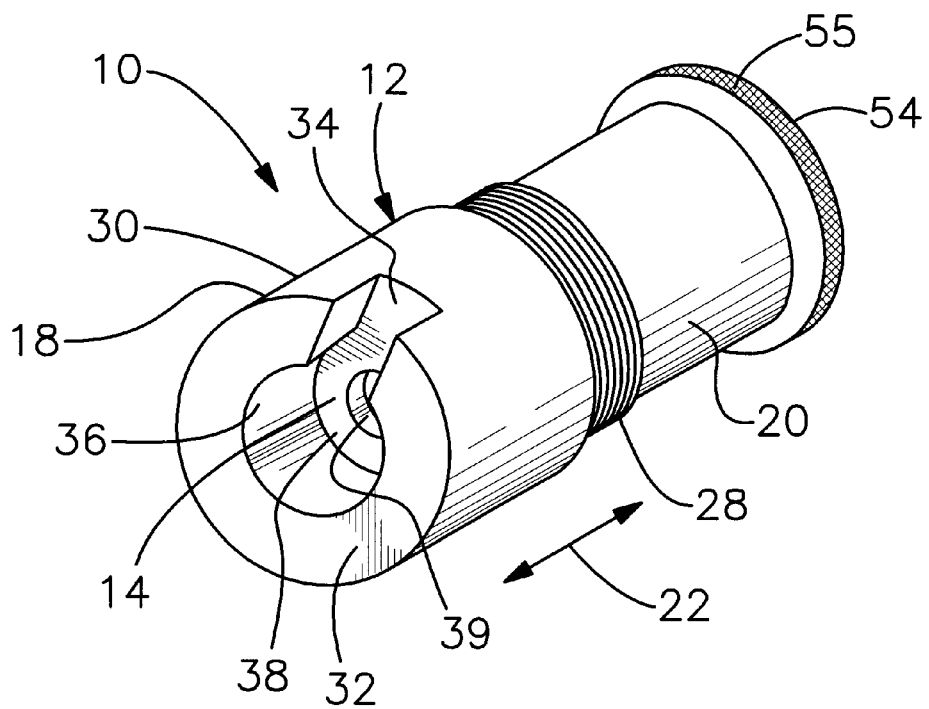
FIG. 1 is a perspective view of a preferred fiberoptic cable tester in accordance with this invention.
Figure 2:
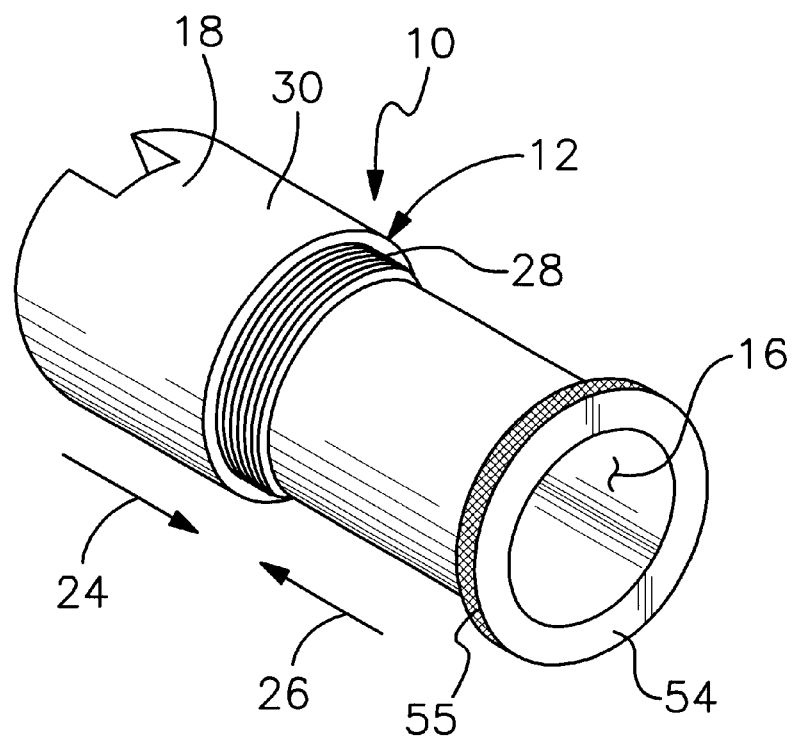
FIG. 2 is an alternative perspective view of the fiberoptic cable tester.

There is shown in FIGS. 1 and 2 a fiberoptic cable tester 10 having a generally tubular body 12. The body includes an inlet fitting 14, best shown in FIG. 1, an outlet 16, best shown in FIG. 2, and an internal central channel, shown more fully below in connection with FIGS. 8 through 13, which communicably interconnects the inlet fitting and the outlet. More particularly, body 12 includes a first generally cylindrical outer body component 18 and a second, inner body component 20, which likewise features a generally cylindrical shape. Body components 18 and 20 are preferably composed of a lightweight, yet high strength plastic. The components may be molded or otherwise formed using various known-manufacturing techniques.

The outer and inner body components 18 and 20 are threadably interconnected such that those body components may be longitudinally adjusted relative to one another, both extendably as indicated by double-headed arrow 22 in FIG. 1 and retractably, as indicated by arrows 24 and 26 in FIG. 2. In FIGS. 1 and 2, a set of external threads 28 is depicted on body component 20. These threads operably interengage a complementary set of interior threads formed in outer body component 18. These interior threads are not shown in FIGS. 1 and 2 but are depicted and described more fully below.

Figure 3:
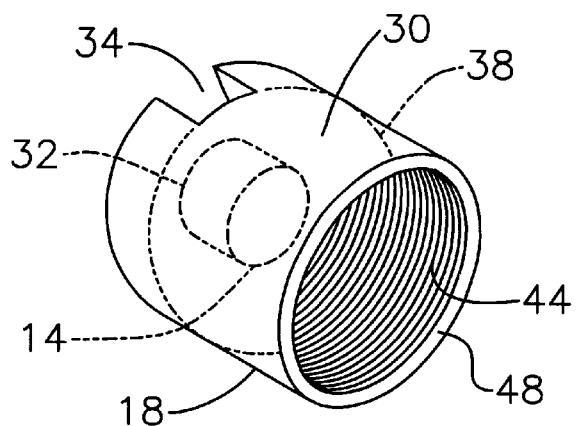
FIG. 3 is a perspective view of the first, outer body component, which features internal threads.
Figure 4:
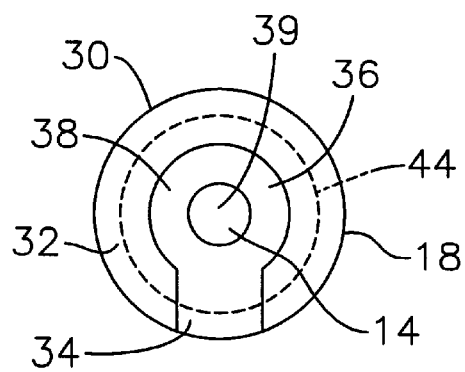
FIG. 4 is an elevational end view of the first body component.
Figure 5:
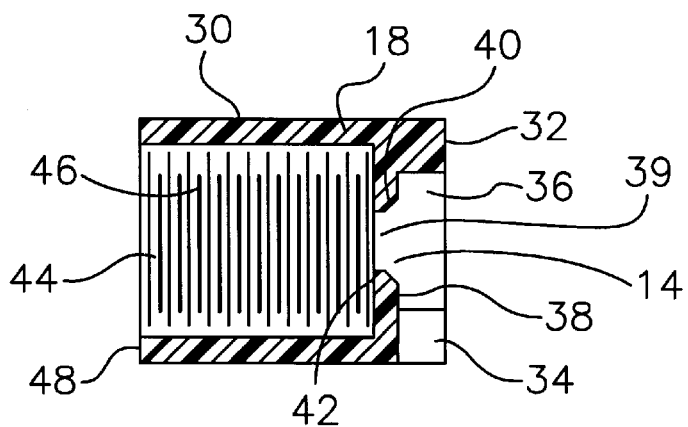
FIG. 5 is a cross-sectional side view of the first body component.

Outer body component 18 is shown alone in FIGS. 3, 4 and 5. Component 18 includes a cylindrical outer wall 30. Inlet fitting 14 is formed proximate a first end of wall 30. The opposite end 48 of the cylindrical wall is open. More particularly, at a first end of the cylindrical outer wall there is formed a generally flat annular first end wall 32 through which a radial notch 34 is formed. Wall 32 surrounds a generally central recess 36. The inner end of recess 36 terminates in an interior first end wall 38. An orifice 39 is formed centrally through interior end wall 38. As best shown in FIG. 5, orifice 39 includes a truncated conical portion 40 and a cylindrical portion 42 that are formed in wall 38. The orifice communicably interconnects receptacle 36 with an internally threaded first channel portion 44 formed centrally through body component 30. The central channel portion carries internal threads 46 that are operably and adjustably interengaged with previously described threads 28 on second body component 20. The precise form of interengagement and operation of the threads is described more fully below. Channel portion 44 maintains a constant diameter through the distal end 48 of body component 30.

Figure 6:
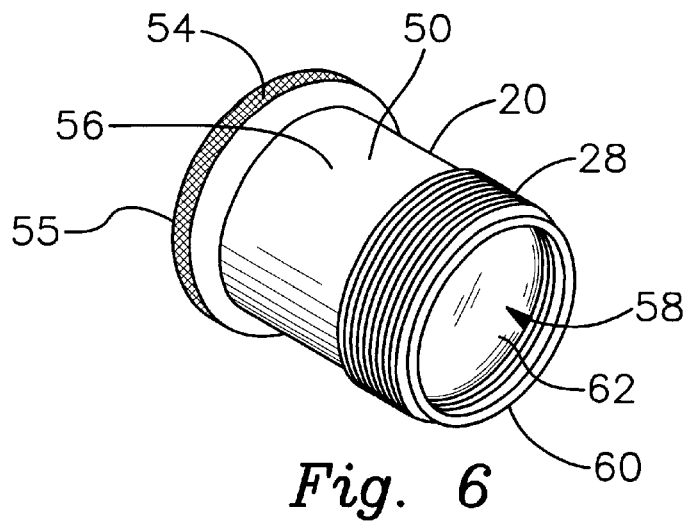
FIG. 6 is a perspective view of the second, inner body component, which carries the magnifying lenses and features external threads.
Figure 7:
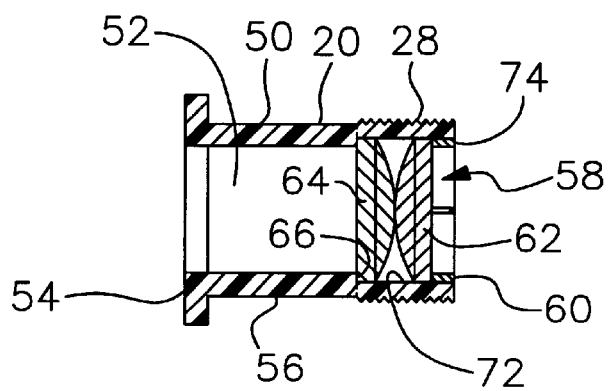
FIG. 7 is a cross-sectional side view of the second body component.

Second body component 20 is shown alone in FIGS. 6 and 7. The inner body component includes a generally cylindrical wall 50. A second channel portion 52 extends centrally through wall 50. An annular flange 54 is connected unitarily to wall 50 at one end thereof. Flange 54 includes a knurled circumferential surface 55. External threads 28 are carried proximate the opposite end of the cylindrical wall. Between flange 54 and threads 28 cylindrical wall 50 has a generally smooth outer surface 56.

A magnifying and focusing assembly 58 is mounted within channel portion 52 proximate the inner end 60 of body component 20. More particularly, assembly 58 includes a pair of adjoining convex lenses 62 and 64. In the embodiments shown herein, the convex surfaces of the lenses face one another. It should be understood that various alternative magnifying and focusing assemblies may be utilized in accordance with this invention. The diameter of channel portion 52 abruptly increases to an enlarged diameter region 72 proximate end 60 such that a lip 66 is formed circumferentially about the interior wall of the body component 20. Lenses 62 and 64 are mounted within region 72 of channel portion 52. The lenses 62 and 64 have respective diameters that are slightly less than the interior diameter of the enlarged region 72. As a result, the lenses fit relatively snugly within enlarged channel region 72, in the manner best shown in FIG. 7. The flat surface of lens 64 engages annular lip 66 about the periphery of the lens. In certain embodiments, lens 64 may be adhesively secured to lip 66. An annular O-ring 74 is fit within channel 52 proximate end 60 of body component 20. O-ring 74 engages the flat surface of lens 62 and has a thickness that is generally equal to the length of channel portion 52 between lens 62 and the distal 60 of body component 20. O-ring 74 has an outer diameter that is generally equal to or slightly less than the interior diameter of enlarged channel region 72. The O-ring is adhesively secured within the interior channel portion of body component 20. As a result, convex lenses 62 and 64 are held securely in place between lip 66 and O-ring 74. Light passing through channel portion 52 is transmitted through the lenses.

The magnifying and focusing assembly may comprise various types and sizes of lenses. Lenses having a diameter of approximately 20 mm. and a focal length of 40 mm. are particularly preferred. Assorted magnifications may be utilized. The particular magnification is chosen to correspond with the selected fiberoptic cable end fitting being tested.

Figure 8:
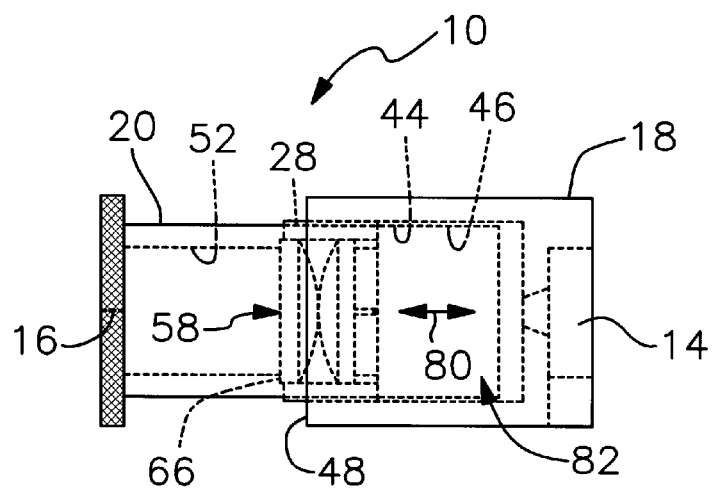
FIG. 8 is an elevational side view of the preferred cable tester with the first and second body components adjustably interconnected.

First and second body components 18 and 20 are adjustably interconnected in the manner shown in FIG. 8. End 60 of inner component 20 is inserted into open end 48 of outer body component 18. The body components are rotated axially relative to one another such that external threads 28 of body component 20 are interengaged with internal threads 46 of body component 18. By rotating the body components relative to one another, the user may position the inner body component longitudinally within the outer body component, as indicated by double-headed arrow 80 in FIG. 8. In this manner, the lens assembly 58 is moved to a desired position within channel portion 44 of body component 18 so that desired light magnification and focusing is achieved when the end fitting of a light transmitting fiberoptic cable is interengaged with apparatus 10. Channel portions 44 and 52 effectively form an elongate channel 82 that extends fully through the tester 10 from inlet fitting 14 to outlet 16.

Figure 9:
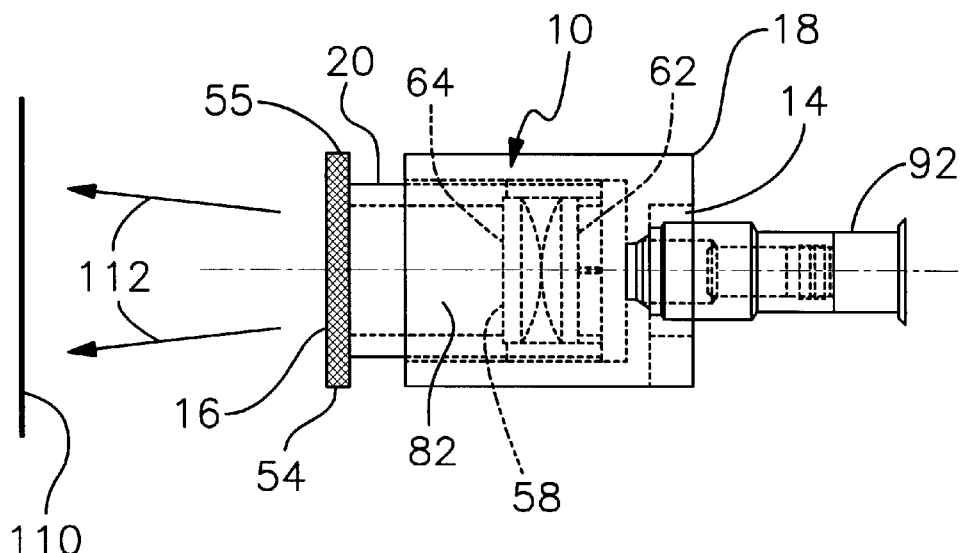
FIGS. 9 through 13 are elevational side views of the preferred fiberoptic cable tester engaged with respective standard fiberoptic cable end fittings.
Figure 10:
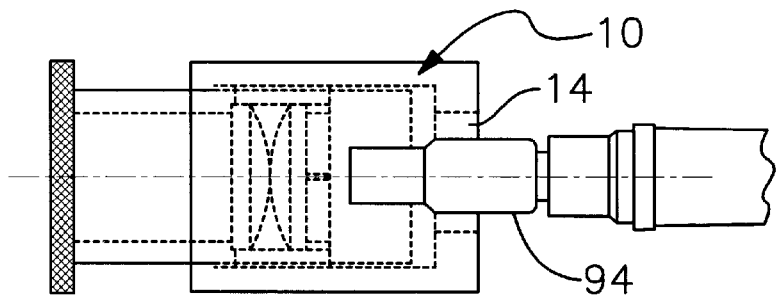
Figure 11:
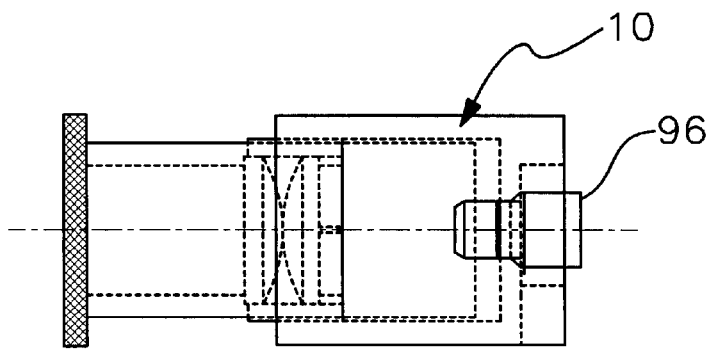
Figure 12:
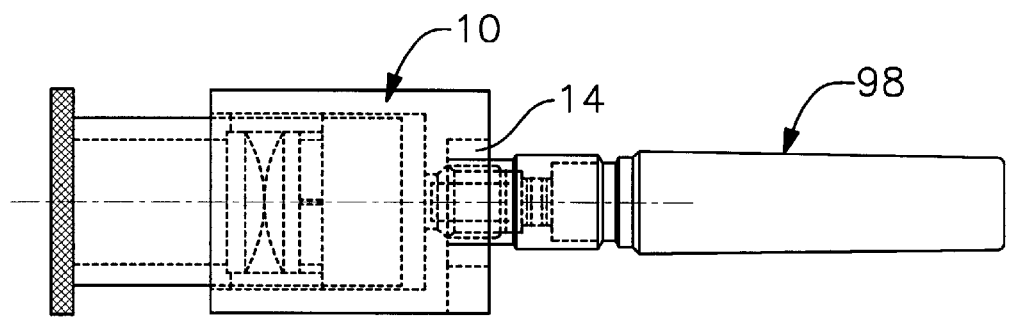
Figure 13:
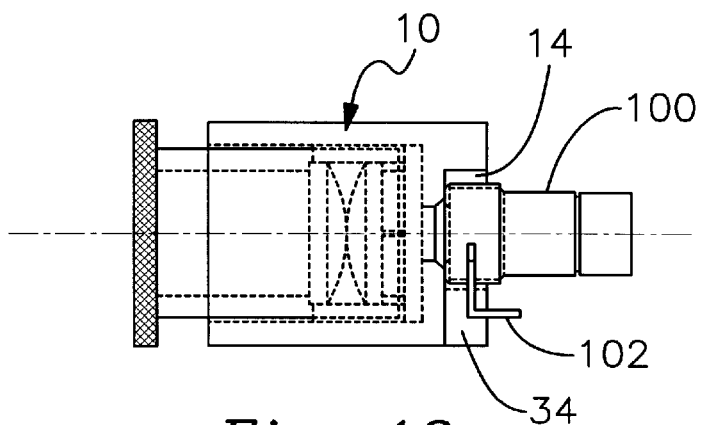

FIGS. 9 through 13 depict respective standard fiberoptic cable end fittings operably interengaged with apparatus 10. In particular, in FIG. 9 an ACMI (TM) snap fitting 92 is received by inlet fitting 14. In FIG. 10, a PillingWeck rotating fitting 94 is communicably interengaged within tester 10 through inlet fitting 14. FIG. 11 illustrates an ACMI male fitting 96 that is interengaged with the tester. A fitting 98 of the type manufactured by Storz (TM) or Olympus (TM) is interengaged with inlet fitting 14 in FIG. 12. Finally, in FIG. 13 a clip type fitting 100 such as is manufactured by ACMI (TM) and Wolfe (TM) is shown interengaged with apparatus 10. In the latter version, a clip 102 carried by fitting 100 is accommodated within the notch 34 of inlet fitting 14. It should be understood that in each of the illustrated embodiments, as well as in versions wherein other brands of end fitting are interengaged with tester 10, inlet fitting 14 includes a size and configuration that enables it to snugly and operably engage the standard fiberoptic outlet fitting. Interengagement between the outlet fitting of the cable and inlet fitting 14 is such that light emitted by the cable fitting is introduced through the inlet fitting of tester 10 and thereby transmitted through the interior channel 82 and assembly 58 to outlet 16.

Representative operation of tester 10 is shown in FIG. 9. It should be understood that the tester is used analogously with other standard cables, including, but not limited to those shown in FIGS. 10 through 13. In order to determine the condition of a selected fiberoptic cable, the end fitting 92 of the cable is interengaged with inlet fitting 14 of tester 10 in the manner previously described. The opposite end of the fiberoptic cable (not shown) is connected to the output port of a standard fiberoptic illuminator. The illuminator is then activated to transmit light through the cable. This light is discharged from the end fitting (e.g. fitting 92) of the cable and transmitted through central channel 82 of tester 10. This light passes through the convex lenses 62 and 64 of assembly 58 and is discharged from outlet 16 of tester 10 as indicated by arrows 112. The operator magnifies and focuses the discharged light. This is accomplished by grasping the exterior knurled surface 55 of flange 54, rotating the inner body component 20 within outer body component 18 and longitudinally adjusting the tester until a focussed and magnified image is obtained to produce a sharp, enlarged image on a test target surface 110.

Figure 14:
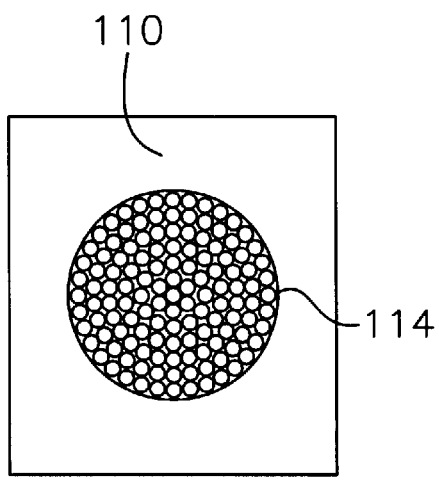
FIG. 14 is a perspective view of a target area on which an image is projected by the tester; the image indicates that a fiberoptic cable engaged with the tester includes largely undamaged fibers and is in proper operating condition.
Figure 15:
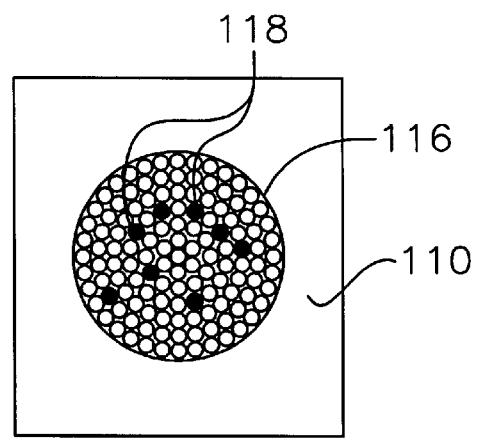
FIG. 15 is a view similar to FIG. 14, but disclosing a projected image from the tester which indicates that the fibers of an engaged cable are broken and the cable has deteriorated in condition such that it requires replacement.

As shown in FIG. 14 an image 114 is produced against target surface 110. An image that is clear and bright with relatively few dark spots indicates that few if any individual fibers are broken. An unbroken individual fiber transmits light to the tester without interruption and the light from that fiber is projected onto target area 110. Conversely, if an individual fiber is broken, it will not transmit light and a corresponding black spot or dot will appear within the image. For example, in FIG. 15, an image 116 is projected on target area 110. This image contains darkened regions 118 that correspond to and reveal numerous broken optical fibers that do not transmit light. When a large or substantial area of the projected image contains such darkened regions, this indicates that the fiberoptic cable is worn or deteriorated due to a corresponding number of broken fibers. As a result, the cable should be replaced.

For each type of fiberoptic end fitting being tested, the body components 18 and 20 of tester 10 are longitudinally adjusted, as described above, to provide an appropriate magnification and to focus the projected image against target area 110. The adjustability of the tester permits a clear image to be obtained for virtually any fiberoptic cable end fitting. As a result, the tester is extremely versatile and permits the condition of any standard cable to be quickly and accurately checked and replaced when required. This results in significantly improved and reliable fiberoptic illumination, particularly in surgical and other medical applications. The cause of poor lighting (i.e. whether it is the cable or the illumination source) can also be ascertained almost immediately. The tester thereby saves time and significantly improves efficiency, particularly in medical and dental environments where such benefits are quite important.

Figure 16:
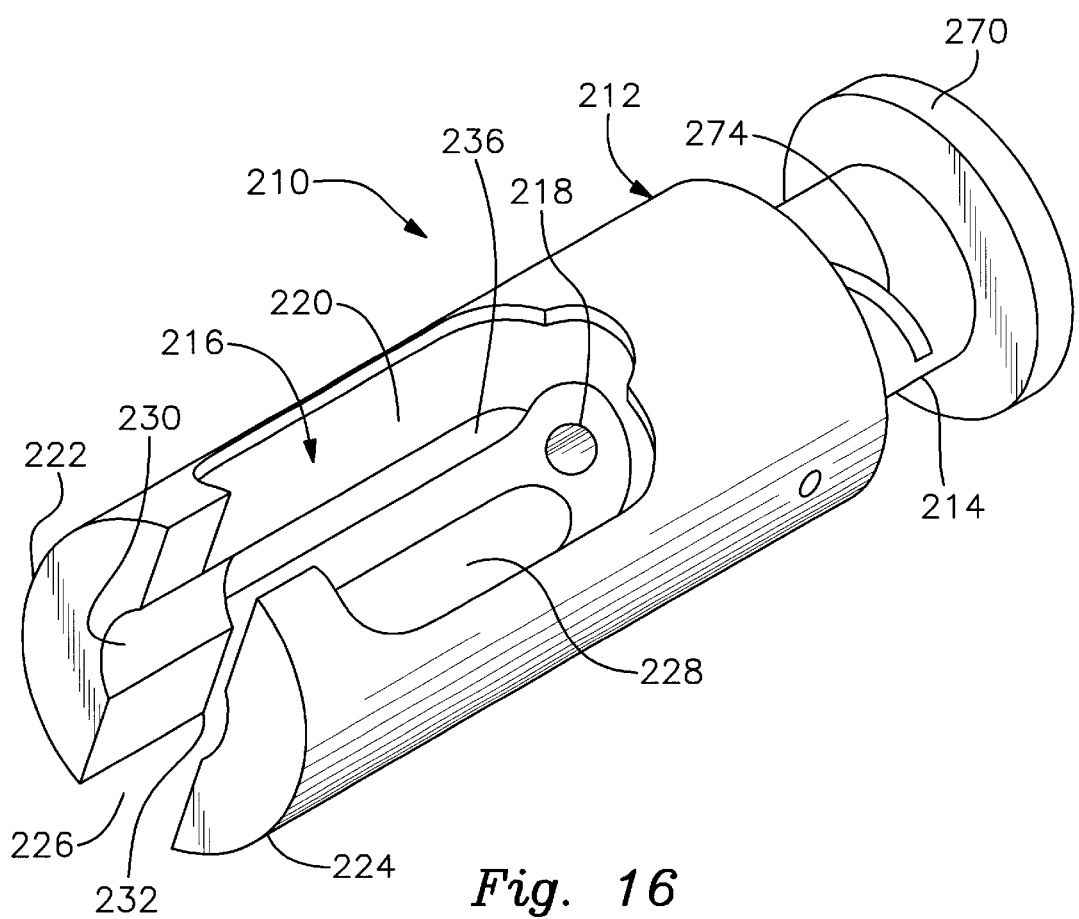
FIG. 16 is a perspective view of an alternative preferred tester according to this invention.

There is shown in FIG. 16 an alternative preferred tester 210 according to this invention. This version again includes a pair of generally cylindrical body portions 212 and 214 that are telescopically interconnected and longitudinally adjustable relative to one another. As is further shown in FIG. 17, body portion 212 includes means defining an inlet fitting 216. The inlet fitting includes a central receptacle or orifice 218 having a truncated conical surface best shown in FIG. 17. The fitting also includes a longitudinal slot 220 that extends from the distal end of body portion 212 to orifice 218. Slot 220 intersects the cylindrical outer wall of body portion 212 along diametrically opposing sections of the cylindrical body. As a result, body portion 212 defines a pair of fingers 222 and 224 that extend rearwardly from orifice 218. The longitudinal slot 220, and therefore fingers 222 and 224, are shaped such that a relatively narrow entrance 226 is formed into the slot. This widens into a relatively broad slotted section 228. A pair of opposing, generally semi-circular grooves 230 and 232, FIG. 16, are formed in fingers 222 and 224, respectively, beside relatively narrow entry 226. The interior of slot 220 is configured to include relatively thin lips 236 and 238 on respective sides of the slot. A curved recess 239 is formed at the inner end of the slot. The inlet fitting thereby includes a shape that accommodates virtually all types of fiberoptic cables. It should be understood that body portion 212 (as well as body portion 214) typically comprises a molded plastic, although various other materials and methods of manufacture may be employed.

As best shown in FIG. 17, orifice 218 communicates with a first, axially central channel 250 formed through body portion 212. Channel 250 extends from orifice 218 completely through the body portion 212 to the right-hand end of that body portion. The first channel portion telescopically receives cylindrical second body portion 214.

Second body portion 214 includes an axially central second channel portion 252 that extends longitudinally through body portion 214. Magnification and focusing means are mounted within 252 in the manner best shown in FIG. 17. In particular, a pair of opposing convex lenses 254 and 256 are mounted within channel portion 252 proximate an inner end of the channel. Lens 254 abuts against an annular inner end wall 258 of body portion 214. Lens 256 similarly abuts an annular spacer nut 260 that is fixed threadably or otherwise with the interior of channel 252. A spacer washer 262 separates lenses 254 and 256. It should be understood that the foregoing lens construction is identical or similar to the lens construction described in connection with the embodiment of FIG. 1–13 above.

Body portion 214 carries an annular flange 270 proximate the outer distal end thereof. See FIGS. 16–18. The cylindrical exterior wall of body portion 214 carries a pair of opposing helix-shaped tracks 272, 274 which are wound about the cylindrical body. Tracks 272 and 274 are respectively engaged by spring biased bearing elements 280 and 282, as shown in FIG. 17. Each of the bearing elements is urged inwardly into operable engagement with its respective track by a spring insert 286. To longitudinally adjust the cylindrical body portions relative to one another, the operator grasps flange 270 and axially rotates cylindrical body portion 214 relative to body portion 212. This causes bearing elements 280 and 282 to travel helically within respective tracks 272 and 274. Body portion 214 thereby may be longitudinally adjusted relative to body portion 212, as indicated by doubleheaded arrow 290.

Figure 19:
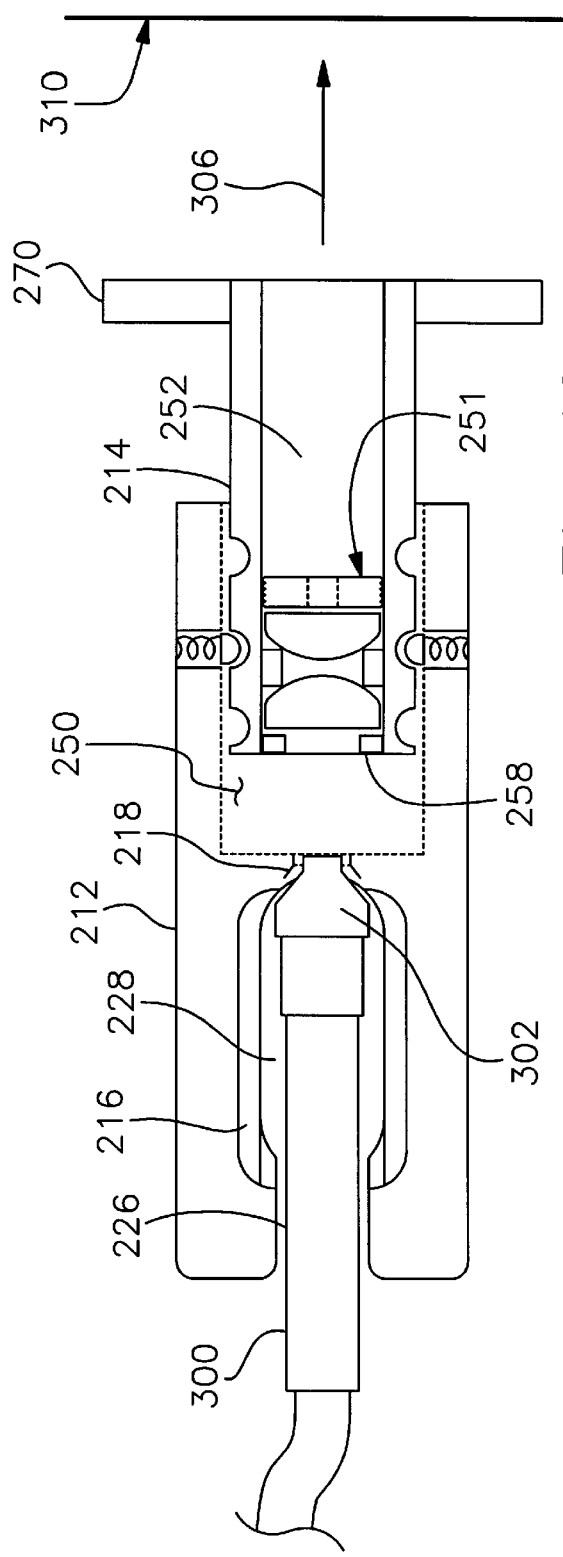
FIG. 19 is an elevational, cross sectional view of the preferred tester of FIG. 16 with an engaged fiberoptic cable.

In operation, cable 300 is inserted into inlet fitting 216 of body portion 212 in the manner shown in FIG. 19. In this case, a straight angle or 180° fiberoptic cable is illustrated. The cable is inserted through entry 226 and relatively wide portion 228 of slot 216; outlet fitting 302 is inserted into orifice 218 in the manner similar to the previously described embodiment. Light is transmitted through cable 300 and emitted by fitting 218 through channel portion 250. The light passes through the central opening 259 in wall 258 into channel 252 of body portion 214. As indicated by arrow 306, the light is then transmitted through the lenses of focusing and magnification device 251. The operator grasps flange 270 and telescopically adjusts body portion 214 relative to body portion 212 so that light 306 is magnified and focused appropriately against a screen 310. An image is projected in the manner previously shown in FIG. 14 and 15. That image indicates the quality of the individual fibers in cable 300. Large amounts of darkened area indicate an unacceptably high level of fiber breakage. A clear or bright image projection indicates that the cable is of acceptable quality.

Figure 20:
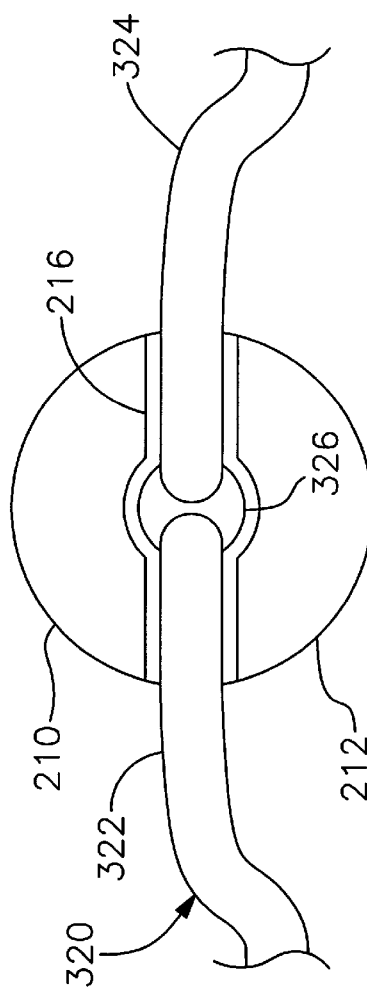
FIG. 20 is an elevational end view of the preferred tester of FIG. 16 engaged with and testing a bifurcated fiberoptic cable.

As shown in FIG. 20, tester 210 is particularly suited for use with a bifurcated fiberoptic cable 320. Such bifurcated cable includes a pair of cable segments 322 and 324 that are connected to a light emitting fitting 326 in a known manner. To test this cable, fitting 326 and attached cable segments 320 and 324 are introduced into longitudinal slot 216 in body portion 212. Fitting 326 engages the central orifice of the tester in a manner previously described. The cable segments 322 and 324 extend laterally through slot 216 and extend out of respective sides of body portion 212. In effect, the segments of the bifurcated cable exit the tester through the side walls. Light emitted from the outlet fitting of the bifurcated cable is transmitted through tester 210 and projected against a target screen. It should be understood that this type of inlet fitting is particularly suitable, not only for bifurcated cables, but also for cables wherein the cable is attached to the light emitting fitting at an angle of 45°, 90° or alternative angles other than 180°. In any event, the engaged cable is tested quickly, conveniently and accurately in the above described manner such that worn or damaged cable is promptly detected and repaired or replaced if needed.

Although specific features of the invention are shown in some of the drawings and not others, this is for convenience only, as each feature may be combined with any and all of the other features in accordance with this invention.

Other embodiments will occur to those skilled in the art and are within the following claims.

What is claimed is:

1. An apparatus for testing a fiberoptic cable, which cable includes a light inlet and a light discharge portion located at opposite ends thereof, the inlet being communicably engaged with a standard fiberoptic illuminator such that light from the illuminator is transmitted through the cable to the discharge portion, said apparatus comprising:
   a body having an inlet fitting that is engaged by the discharge portion of the fiberoptic cable to introduce light into the body, an outlet from which light is emitted, and a light conducting internal channel that communicably interconnects said inlet fitting and said outlet; and
   means mounted within said channel between said inlet fitting and said outlet for magnifying and focusing light introduced into said body from said fiberoptic cable such that the light emitted from said outlet of said body is projected onto a target surface to produce a visually perceptible image that indicates the condition of the fiberoptic cable.

2. The apparatus of claim 1 in which said body includes generally cylindrical first and second body components that are axially aligned and telescopically interconnected such that said cylindrical components are longitudinally adjustable relative to one another to magnify and focus the image produced by the projected light on the target area.

3. The apparatus of claim 2 in which said first body component includes said inlet fitting and said second body component includes said outlet, said channel being defined by a first channel portion formed through said first body portion in communication with said inlet fitting and a second channel portion being formed through said second body component in communication with said outlet.

4. The apparatus of claim 2 in which said second body component is received in said first channel portion and adjusted longitudinally within said first channel portion.

5. The apparatus of claim 1 in which said means for magnifying and focusing includes a pair of lenses.

6. The apparatus of claim 5 in which said lenses have respective convex surfaces arranged to face one another within said channel.

7. The apparatus of claim 6 in which said lenses are permanently mounted within said second body component.

8. The apparatus of claim 2 in which said second body component includes a circumferential flange formed proximate a distal end of said second body component.

9. The apparatus of claim 2 in which said inlet fitting includes a slot that extends longitudinally through said first body portion and which intersects an exterior cylindrical wall of said first body portion.

10. The apparatus of claim 9 in which said inlet fitting further includes a central receptacle that communicates with said first channel portion and that communicably engages the light emitting outlet of the fiberoptic cable.

11. The apparatus of claim 2 in which one of said body components includes a threaded track wound about said body component and the other said body component carries at least one bearing element that slidably engages the track.

12. The apparatus of claim 11 further including spring means for urging each bearing element into slidable interengagement with the threaded track.

13. The apparatus of claim 12 in which said threaded track includes a pair of opposed helical track elements, each element being formed in one of said body components and receiving a respective bearing element carried by the other said body component.

14. The apparatus of claim 2 which said first body component includes a pair of opposing longitudinal slots for accommodating a bifurcated fiberoptic cable, each said slot receiving a respective segment of the cable.

15. An apparatus for testing a fiberoptic cable, which cable includes a light inlet and a light discharge portion located at opposite ends thereof and a plurality of light conducting fibers extending between the inlet and discharge portion, the inlet being communicably engaged with a standard fiberoptic illuminator such that light from the illuminator is transmitted through the fibers of the cable to the discharge portion, said apparatus comprising:
   a body having an inlet fitting that is engaged by the discharge portion of the fiberoptic cable to introduce light from the plurality of fibers into the body, an outlet from which light is emitted, and a light conducting internal channel that communicably interconnects said inlet fitting and said outlet; and
   a lens assembly mounted within said channel between said inlet fitting and said outlet for magnifying and focusing the light introduced into said body from said fiberoptic cable and for projecting the light from the outlet of the body onto a target surface to produce a visually perceptible image that indicates the condition of the fiberoptic cable and the plurality of fibers therein.

16. A method of testing a fiberoptic cable, which cable includes a light inlet and a light discharge portion located at opposite ends thereof and a plurality of light conducting fibers extending between the inlet and the discharge portion, said method comprising:

communicably engaging the inlet of the cable with a standard fiberoptic illuminator such that light from the illuminator is transmitted through the fibers of the cable to the discharge portion, providing a test apparatus, which includes a body having an inlet fitting, an outlet, a light conducting internal channel that communicably and optically interconnects the inlet fitting and the outlet, and a lens assembly mounted in the channel between the inlet fitting and the outlet for magnifying and focusing light transmitted through the channel, engaging the discharge portion of the fiberoptic cable with the inlet fitting of the test apparatus to introduce light from the plurality of fibers into the body and through the channel, which light is magnified and focused by the lens assembly; and projecting light from the outlet of the body onto a target surface to produce a visually perceptible image that indicates the condition of the fiberoptic cable and the plurality of fibers therein.

* * * * *